UNITED STATES PATENT OFFICE.

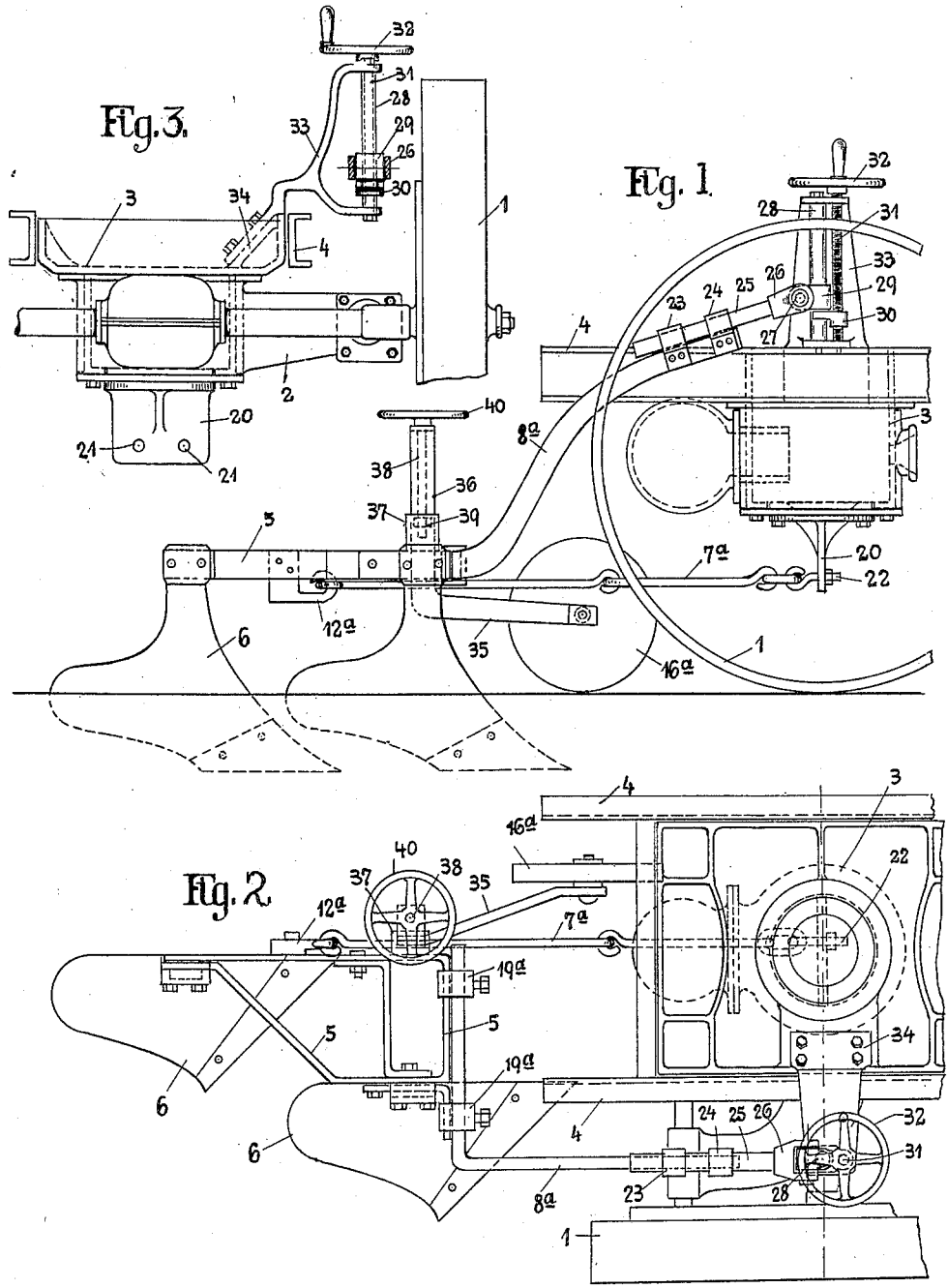

HERMANN RÜEDY, OF JESTETTEN, GERMANY.

MOTOR-PLOW.

1,397,146.      Specification of Letters Patent.      Patented Nov. 15, 1921.

Application filed December 10, 1920. Serial No. 429,724.

*To all whom it may concern:*

Be it known that I, HERMANN RÜEDY, a citizen of Germany, and resident of Jestetten, Germany, have invented certain new and useful Improvements in Motor-Plows, of which the following is a specification.

My invention generally has reference to improvements in motor plows and relates more specifically to means for readily attaching to a motor truck, for instance of the type described in my U. S. Patent 1,305,171, a plow share frame in very close relation to the truck end, and the particular object of the invention is to shorten the length of the combination vehicle without danger of the plow share frame or its shares interfering in any way with the proper operation of the truck when making turns.

For the purposes of my invention I make the plowshare frame of substantially triangular shape and make it considerably narrower than the width of the truck frame, say approximately one-half thereof, and attach it to the latter by an articulated draw bar so that the operative pull of the latter on the plow frame is exerted on the long side of the triangle which carries the rear share and extends approximately in the vertical median plane of the truck frame. The plow frame is supported on its long side by a guide or support wheel, and its other side, which carries the front share, is supported by an upwarly curved carrier arm extending in between the respective truck stringer and the drive and steering wheel and adjustably controlled by a hand operated screw spindle for lowering or raising the plow frame relative to the truck frame, as will now be described in detail in connection with the accompanying drawings, in which Figure 1 is a side elevation of an embodiment of my invention with only part of the truck chassis and wheel shown; Fig. 2 is a top view thereof, and Fig. 3 is a rear view of the truck, the right wheel being partly broken away and the left one and the adjacent parts being omitted.

In the several figures only that part of the chassis is shown to which the plow frame is to be attached. In the truck frame, which includes the two side stringers 4, is suitably supported a short vertical steering column 3 for horizontally steeringly oscillating the bearings 2 of the axles for the wheels 1, as fully described in my previously cited patent.

The plow frame 5 is of practically triangular shape, the short cathetus of which is of a width of about one-half that of the truck chassis proper, the long cathetus extending in a line passing substantially through the vertical axis of the steering column, and to the hypotenuse of which the two plow shares 6, 6 are secured. These plow shares are vertically adjustable each one by itself by a suitable hand-operated spindle, well known in the art and not shown here. From the steering column case depends a T-member 20 having two holes 21. A nut-secured eye bolt 22 is mounted in one of these holes and a drawbar 7$^a$ is articulated to this eye bolt in suitable manner, as clearly shown in Figs. 1 and 2. The other eyed end of this draw bar is hooked over the hook 12$^a$ depending from the plow frame. A rectangularly bent member 35, 36, mounted on the plow frame, journals at its lower free end a guide and support wheel 16$^a$. The support arm 35 may be of such length that the wheel 16$^a$ is positioned well within the confines of the chassis without danger of its interfering with the steering operation of the truck wheels. On the other side the plow frame is supported by a horizontally rectangularly bent and then upwardly curved member 8$^a$. Its transverse portion is connected to the respective plow frame cross-member by means of clamps 19$^a$, which normally rigidly connect the parts, but if required allow of relative adjustment or disconnection. The member 8$^a$ is then curved upwardly and forwardly and is slidably connected at its upper free end to a rod 25 by means of loosely fitting collars 23, 24. The forked head-piece 26 of the rod 25 is pivotally connected by a cross-pin 27 to a sleeve 29 adapted to be vertically displaced along a stationary guide spindle 28. This latter is mounted in a bracket member 33 extending from a chassis part 34. (Fig. 3.) In this bracket is further journaled a screw-spindle 31 operable by a handwheel 32 for axially moving a nut 30, a lateral extension of which engages under the sleeve 29. By manipulation of the handwheel in the one or the other direction, the support member 8$^a$ may then be raised or lowered for correspondingly altering the relative height of the plowshares.

For adjusting the support wheel 16$^a$ for the same purpose the arm 35 is extended above the plow frame to present a vertically upstanding support arm 36, and the latter is guided for vertical displacement in a bearing 37, fixed to the plow frame and journaling a screw spindle 38 provided with a handwheel 40, which spindle coöperates with a nut 39 fast on the upstanding arm 36. By manipulation of the handwheel 40 this side of the plow frame can be adjusted in height relative to the ground traveled over.

From the above it will be clear that a plow frame, or for that matter a mowing machine frame or the like, if similarly equipped, may readily be attached to my improved truck frame, close up to the latter, making a very short, compact unit, easily adjustable in its operative parts.

What I claim is:—

1. In a motor plow of the character set forth, in combination with a truck chassis including a steering column and steering wheels journaled thereon, a plow frame of substantial triangular shape and approximately half the width of said truck chassis, the long side of said plow frame extending substantially in the median line of said truck chassis passing through the center of said steering column, a wheel adjustably supporting the long side of said plow frame, an upwardly curved member adjustably supporting the other side of said plow frame, and an articulated draw-connection between said plow frame and said truck chassis.

2. In a motor plow of the character set forth, in combination with a motor truck chassis including a steering column and steering wheels operated thereby, a plow frame of substantially triangular shape and approximately one-half the width of said chassis and lying substantially on one side of the median line of said chassis passing through the center of said steering column with the long side of said triangular plow frame also in this median line, an articulated draw-connection between said truck chassis and said plow frame, a wheel supporting the long side of said plow frame, and means for adjusting the relative height of said support wheel, a member adjustably supporting the opposite side of said plow frame, having a right angularly bent portion adapted to be adjustably secured to said plow frame, and an upwardly curved portion extending in between said truck chassis and the respective steering wheel, and means for adjustably connecting the upper free end of this curved portion to the chassis, comprising a bracket member extending from the chassis, a manually operable screw spindle journaled in said bracket and a nut presenting a lateral extension threading on said spindle, a smooth spindle fixed in said bracket and a sleeve thereon adapted to be relatively axially displaced by said nut extension, a rod hingedly connected to said sleeve, and a yieldable connection between said rod and the upper free end of said curved member.

In testimony whereof I affix my signature in presence of two witnesses.

HERMANN RÜEDY.

Witnesses:
 AUGUST RUEGG,
 T. FRANK.